United States Patent [19]

Brager et al.

[11] 4,309,788
[45] Jan. 12, 1982

[54] SELF-CONTAINED CLEANER FOR TRAILER INTERIORS

[76] Inventors: Douglas R. Brager, 2024 W. Greenough Dr.; Randall J. Kappes, 907 Alice, both of Missoula, Mont. 59801

[21] Appl. No.: 97,624

[22] Filed: Nov. 27, 1979

[51] Int. Cl.³ ............................................. B60S 3/00
[52] U.S. Cl. .................................. 15/53 A; 15/21 E; 15/DIG. 2
[58] Field of Search .................. 15/21 E, 50 C, 50 R, 15/56, 53 A, DIG. 2; 239/184, 146, 186, 227, 304, 305; 134/45, 166, 167 R, 168 R

[56] References Cited

U.S. PATENT DOCUMENTS

| Re. 29,987 | 5/1979 | Crandall | 15/53 A |
|---|---|---|---|
| 2,876,472 | 3/1959 | Rousseau | 15/53 A |
| 3,830,430 | 8/1974 | Hartunian | 15/21 E |
| 3,833,961 | 9/1974 | Fortman | 15/50 C |
| 4,050,109 | 9/1977 | Learned | 15/53 A |
| 4,112,533 | 9/1978 | Brager | 15/53 A |
| 4,135,270 | 1/1979 | Miner | 15/53 A |

*Primary Examiner*—Edward L. Roberts
*Attorney, Agent, or Firm*—Sughrue, Mion, Zinn, Macpeak & Seas

[57] ABSTRACT

A self-propelled vehicle for cleansing the internal surfaces of a partially enclosed chamber, such as a trailer body, is provided with a battery powered electric motor. The electric motor provides power for a water pump, a drive motor, and hydraulically powered accessories such as cleaning brushes. The vehicle is further provided with storage tanks for housing water, detergents, and disinfectants, which are used during the washing and rinsing cycles. By this manner, a vehicle is provided which is completely self-contained, thus eliminating the need for external power sources and umbilical cords to carry power, water, and chemicals to the vehicle assembly.

17 Claims, 8 Drawing Figures

SELF-CONTAINED CLEANER FOR TRAILER INTERIORS

BACKGROUND OF THE INVENTION

Various forms of washing assemblies have been provided for washing the interior surfaces of large trailers and other vehicle bodies. In one type of known washing device a horizontal boom having washing heads on the free end thereof is axially movable into and out of an associated trailer or other vehicle body. Examples of this type of washing device are disclosed in U.S. Pat. Nos. 4,112,533, 3,961,983, and 3,689,318. It is an object of the present invention to eliminate the cost and inconvenience associated with manufacturing these large, expensive boom-type devices.

A second type of washing device includes a mobile frame which is driven into the rear of a trailer from a support platform registered with the open end thereof. Such washers of this type are normally provided with flexible conduits which supply electric power, water, and detergents from an external source to the washing device. In contrast, the device of the present invention is designed to be completely self contained, thus eliminating the need for bulky storage tanks and external power units which must be mounted on a nearby dock, thereby preventing complete portability of the device.

In the known devices of the prior art cable reels are provided on the vehicular structure of the washers in order to pay out and take up the flexible conduits which are laid on the vehicle floor as the machine enters the vehicle body. Control systems are provided for regulating the take up and pay out speed of the cable reel, so that the washer vehicle does not run over and damage the flexible conduits. Malfunctions of the cable reel control system, or the uneven winding of the flexible conduits on the cable reels have given rise to functional and operational problems in this type of washing device. The device of the present invention, being completely self-contained, does not suffer from the above mentioned operational disabilities.

Examples of various forms of this latter type of washing device are disclosed in U.S. Pat. Nos. 3,534,746 and 3,830,430.

BRIEF DESCRIPTION OF THE INVENTION

The instant invention consists of a four wheeled machine for the interior washing of a trailer body. The machine is set on a base frame structure which supports the machine and is provided with a drop gate at the front end thereof to close the gap between the trailer and the base frame for the machine's entrance into the rear of the trailer. The base frame may be mounted on either a stationary dock for back-up use, or on a laterally moving base for driveby use. A trailer is first driven into position, and the interior washer is positioned at the rear opened end of the trailer. An operator then starts the interior washer by a one-button push-button control. Once the machine is started, it moves forward on its base allowing the drop gate to lower and come to rest on the rear of the trailer floor. the machine then enters the rear of the trailer spraying soapy water on all four surfaces, and scrubbing the floor with brushes. Detergents are injected into the water flow from a self-contained chemical tank. During the washing and rinsing process, the machine makes a complete traversal of the trailer body, washing the trailer as it moves inwardly thereof, and rinsing the trailer as it moves rearwardly back to its base frame. As the machine exits the trailer, it will return onto its base frame and automatically lift its drop gate as it approaches the rear of the base frame. The machine is then automatically refilled with water while the trailer is pulled forwardly from the washing area and the next trailer to be washed is driven into position.

The main object of this invention is to provide an apparatus for washing the internal surfaces of a trailer or similar vehicle body.

Another object of this invention is to provide a vehicle interior wash machine which does not rely on any external sources for its power, water, and chemicals.

Still another object of this invention is to provide an interior wash assembly which eliminates functional and operational problems associated with cable reel type interior washers by eliminating the need for cable reels and hoses.

A final object of this invention is to provide an interior wash assembly which conforms to conventional forms of manufacture, is of simple construction, and is easy to operate so as to provide a device which will be economically feasible, long-lasting, and trouble-free in operation.

These, together with other objects and advantages which will become subsequently apparent reside in the details of construction and operation as fully hereinafter described and claimed, reference being had to the accompanying drawings forming a part hereof, wherein like numerals refer to like parts throughout.

DETAILED DESCRIPTION OF THE INVENTION

Figure 1:
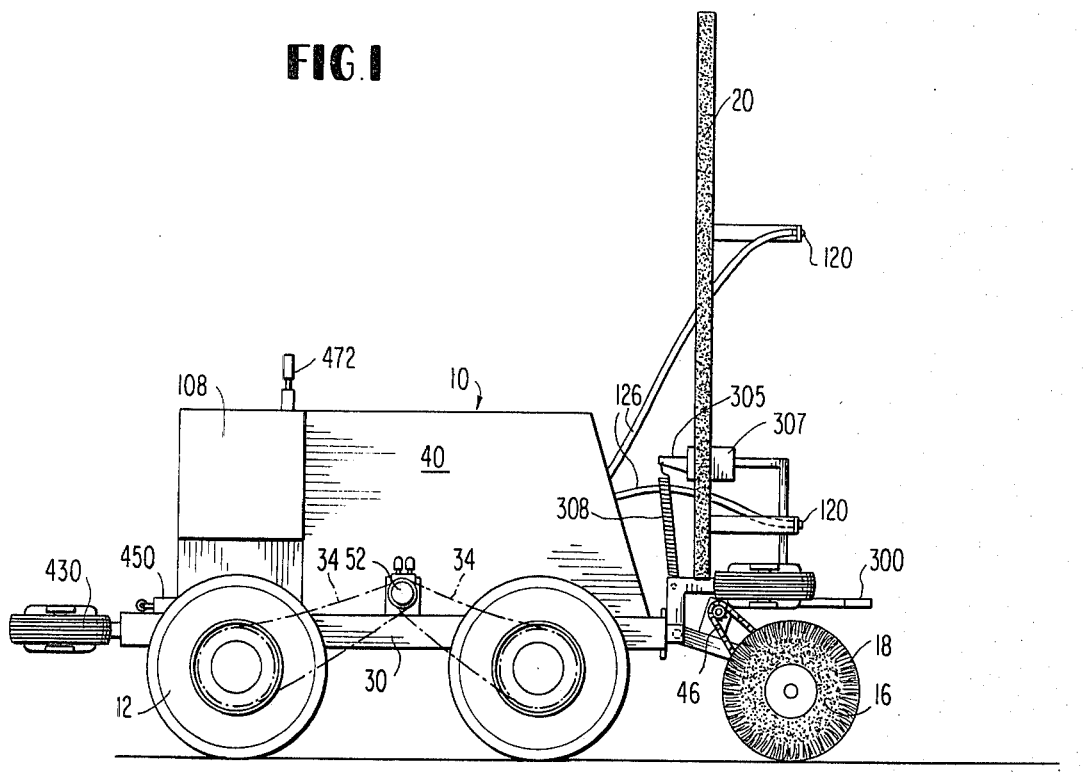
FIG. 1 is a side elevational view of the truck washer of the instant invention.

Referring now more specifically to the drawings, in particular FIG. 1, the numeral 10 generally designates a self-powered truck washing device which is operable to be powered into and out of a vehicle body interior. The truck washing apparatus 10 is generally in the form of a small four-wheeled vehicle having wheels 12 mounted on axles 14 which are rotatably journaled in a frame or chassis member 30. The apparatus is provided with a pair of side wall brushes 20, a floor brush 18, and a pair of bottom side wall brushes 16 which are operable to scrub and clean the vehicle body to be washed.

Power is supplied to the apparatus by four six-volt DC batteries 50 wired in series so as to provide a 24-volt DC system. The batteries drive an electric motor 60 which in turn drives a hydraulic oil pump 62. The batteries and electric motor are enclosed within a housing or cover 40 to prevent any liquids from the washing process from coming into contact therewith.

Figure 8:
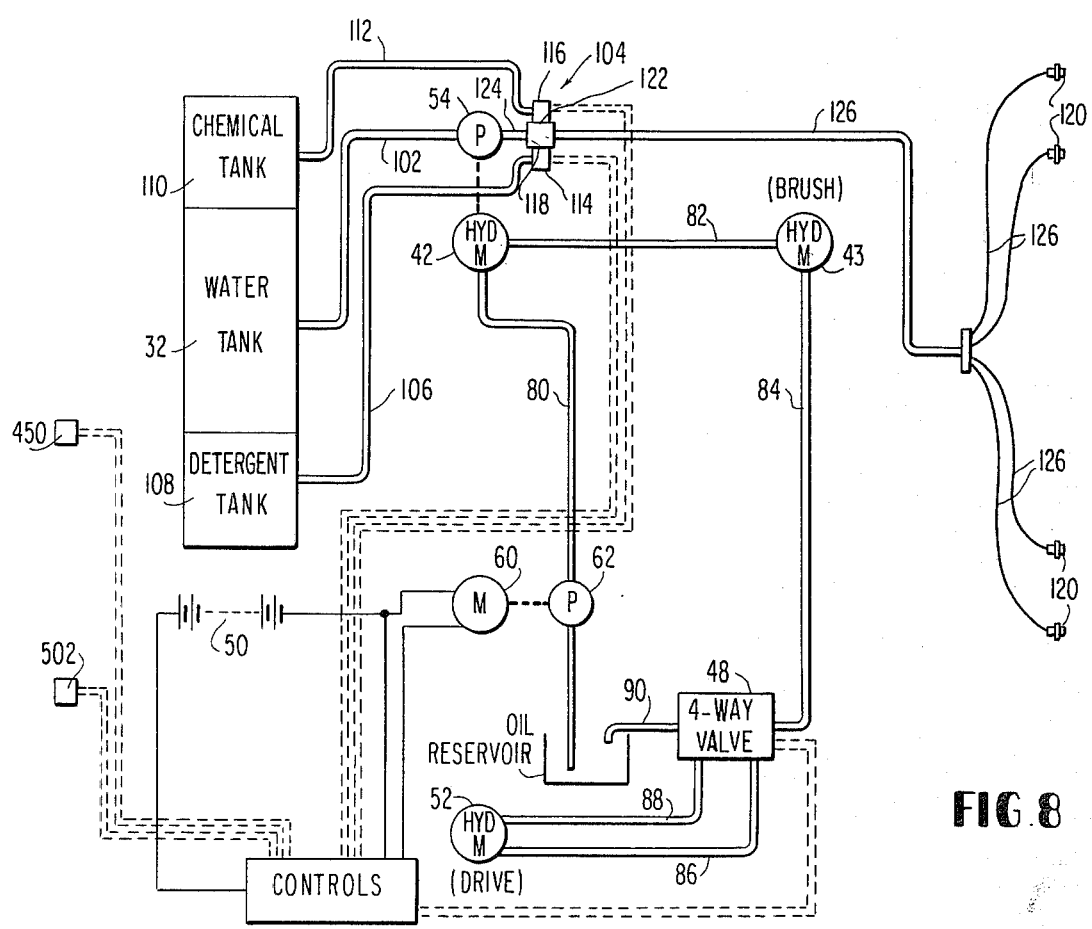
FIG. 8 is a schematic representation of the hydraulic, electric, and water supply systems of the device.

Referring now to FIGS. 1 and 8, a hydraulic oil pump 62 is connected by a fluid conduit 80 to a first hydraulic motor 42 which drives a water pump 54. The output side of the first hydraulic motor 42 is fluidly connected by a fluid conduit 82 to the input side of a second hydraulic motor 43 which serves to drive the front scrubber brushes 16 and 18 by means of a chain and sprocket drive 46. The output side of the second hydraulic motor 43 is in turn fluidly connected by means of a fluid conduit 84 to a four-way hydraulic valve 48.

The valve 48 is operable to direct fluid from the fluid conduit 84 to either a fluid conduit 86 or fluid conduit 88, both of which are fluidly connected to a third hydraulic motor 52. The third hydraulic motor 52 serves as the drive motor for the vehicle 10, and drives the wheels thereof by means of a chain and sprocket drive 34 as shown in FIG. 1. When the hydraulic valve 48 directs fluid through conduit 88, the motor is driven in one direction corresponding to forward movement of the vehicle into the trailer body. When the hydraulic valve 48 delivers fluid to the hydraulic motor 52 by means of the fluid conduit 86, the hydraulic motor is driven in an opposite direction corresponding to reverse movement out of the trailer body. The hydraulic valve operates in a manner such that when fluid is provided to the hydraulic motor through fluid conduit 88, the fluid conduit 86 serves as a return conduit for the hydraulic fluid, and vice versa. The hydraulic fluid returned to the valve 48 thusly is conducted through a further fluid conduit 90 to the input side of the hydraulic oil pump 62, thus completing the hydraulic circuit. It should be noted that energization of the electric motor 60 causes power to be supplied simultaneously to all three hydraulic motors.

As seen in FIG. 8, the first hydraulic motor 42 serves to drive a high pressure water pump 54. The pump 54 operates to deliver water under pressure from a water storage tank 32 through a fluid conduit 124 to a chemical injector 104. Fluid coming out of the chemical injector 104 is transmitted by means of conduits 126 to a plurality of spray nozzles 120 which are mounted on L-shaped brackets 119 (FIG. 2) which are welded to a support frame 117 for the brushes 20. The chemical injector 104 is provided with first and second valves 118 and 122 which are in turn actuated by first and second solenoids 114 and 116. The inlet port of the first valve 118 is connected by a fluid conduit 106 to a detergent storage tank 108, and the second valve 122 is connected at its inlet port by a conduit 112 to a chemical sanitizer tank 110. When the first solenoid 114 is energized by the energization of electric motor 60, it operates to open the first valve 118 which allows a detergent solution to be drawn from detergent tank 108 through conduit 106 and into the chemical injector 104 by the siphon action produced by water flowing through the injector. The mixed solution of detergent and water is then carried by conduits 126 to the spray nozzles. Similarly, when the second solenoid 116 is energized, it operates to open the second valve 122 so that chemical sanitizers are drawn from the tank 110 into the chemical injector 104 by the aforementioned siphon action. It should be noted that when valve 118 is open, valve 122 remains closed and vice versa so that only one of the detergent solution or the chemical sanitizer is injected into the fluid flow at any one time.

The actuation of solenoids 114 and 116 is carried out by a simple electric control system as hereinafter described. When the operator desires to begin the operation of the washing apparatus 10, he pushes a single push button control (not shown) which starts the electric motor 60 which is powered by batteries 50. At the same time, current from the batteries energizes solenoid 114 so that valve 118 is caused to open.

As described previously, electric motor 60 powers hydraulic oil pump 62 which is turn provides power for hydraulic motor 42 which drives the water pump 54. As the water pump forces water through the chemical injector 104, detergent solution is drawn through the open valve 118 and into the water flow by siphon action. Simultaneously, the vehicle 10 is propelled into the interior of the trailer to be washed by the hydraulic motor 52.

Figure 2:
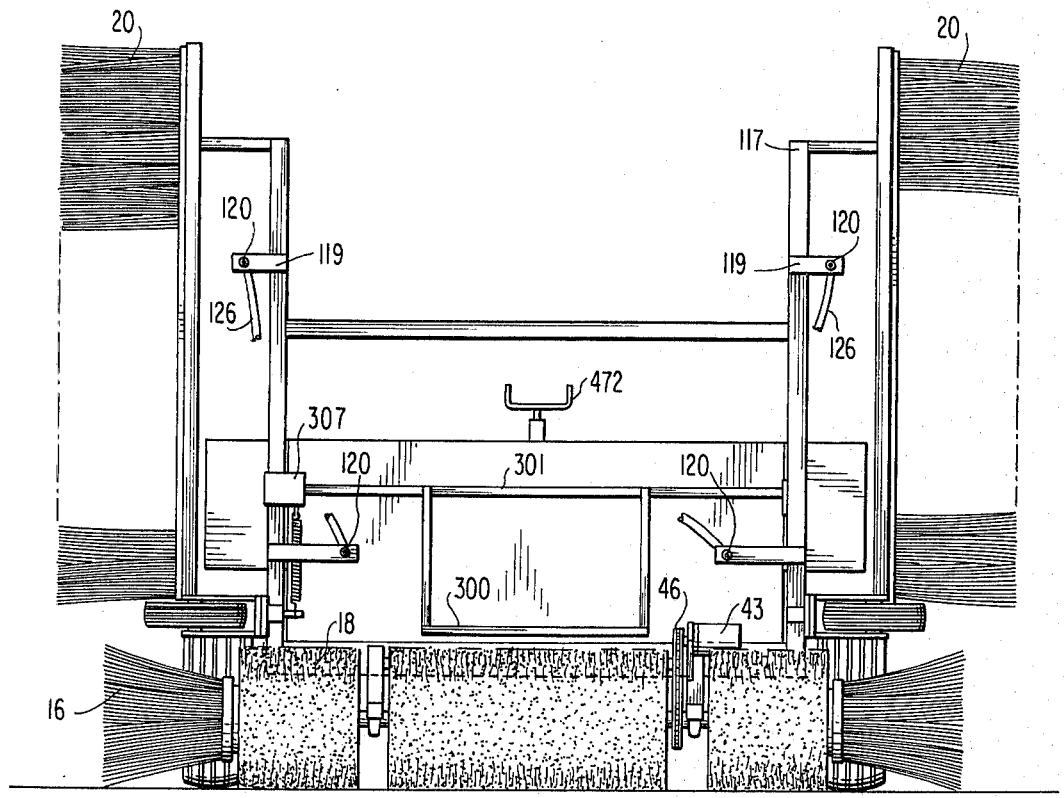
FIG. 2 is a front elevational view of the truck washer of FIG. 1 illustrating the disposition of the floor and side wall brushes.

As the vehicle approaches the front wall of the trailer, a contact lever 300 engages the wall, and pivots downwardly, rotating a tubular rod 301 which is journalled at its opposite ends in the frame member 117 (see FIG. 2). The rotation of the rod 301 serves to rotate an appendage 305 attached thereto against the force of a return spring 308.

The appendage 305, upon rotation, engages a switch 502 contained in the housing 307, causing solenoid 114 to be deenergized, closing the valve 118. At the same time, solenoid 116 is energized to open valve 122 allowing the disinfectant chemicals in tank 110 to be injected into the water flow. When the contact lever 300 engages the front trailer wall, the four-way valve 48 is also actuated by the switch so that fluid is directed from conduit 84 to conduit 86, rather than to conduit 88, thereby reversing the direction of hydraulic motor 52 and causing reverse movement of the vehicle 10 rearwardly out of the trailer body.

Figure 3:
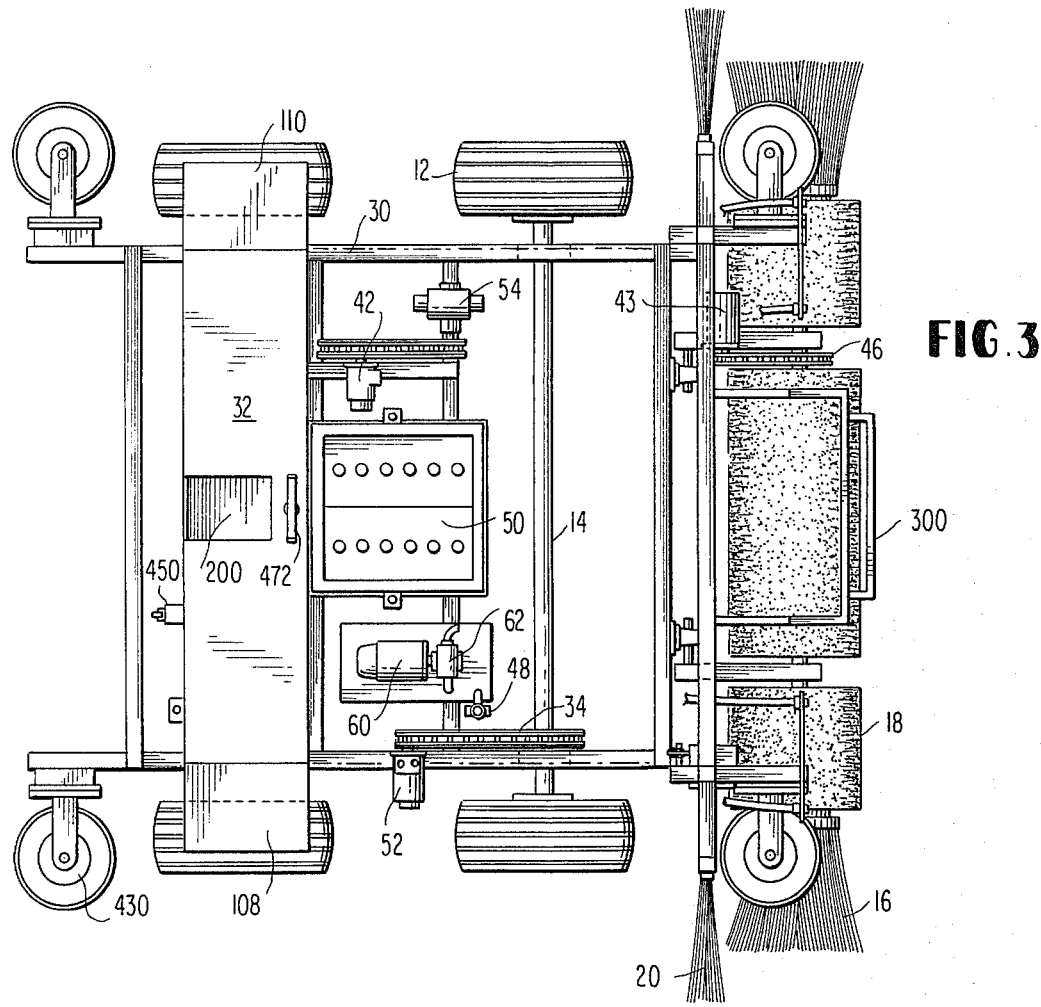
FIG. 3 is a top plan view of the truck washer with parts removed illustrating the disposition of the electric batteries and part of the drive train of the device.
Figure 4:
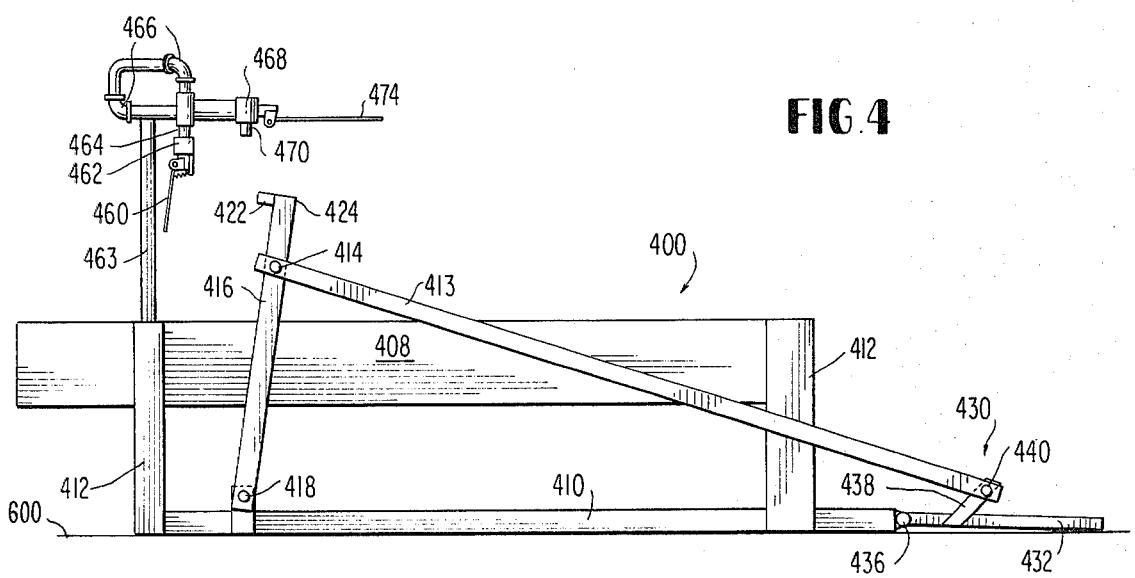
FIG. 4 is a side elevational view of the stationary base frame illustrating the automatic drop gate in its lowered position, and a portion of the automatic refilling means.
Figure 5:
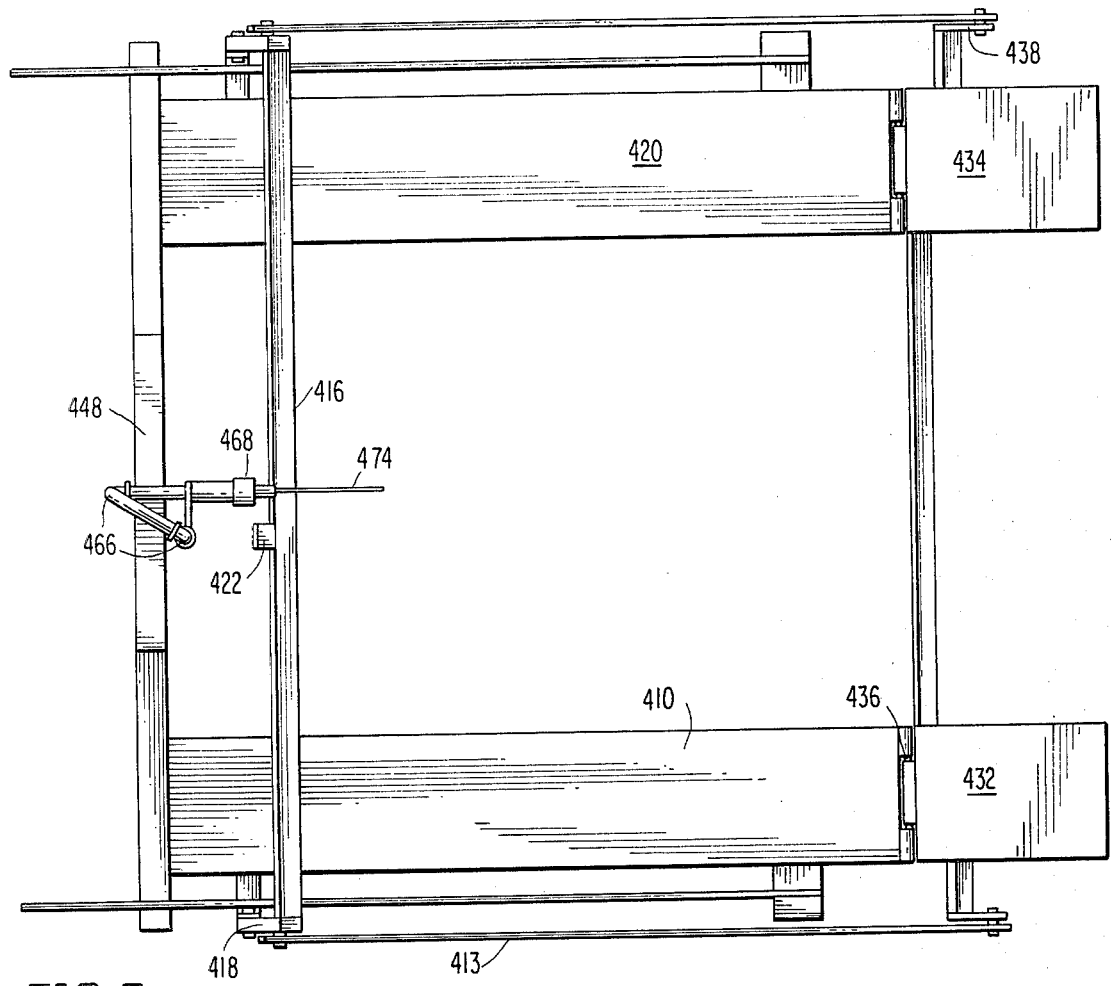
FIG. 5 is a top plan view of the base illustrated in FIG. 4.
Figure 7:
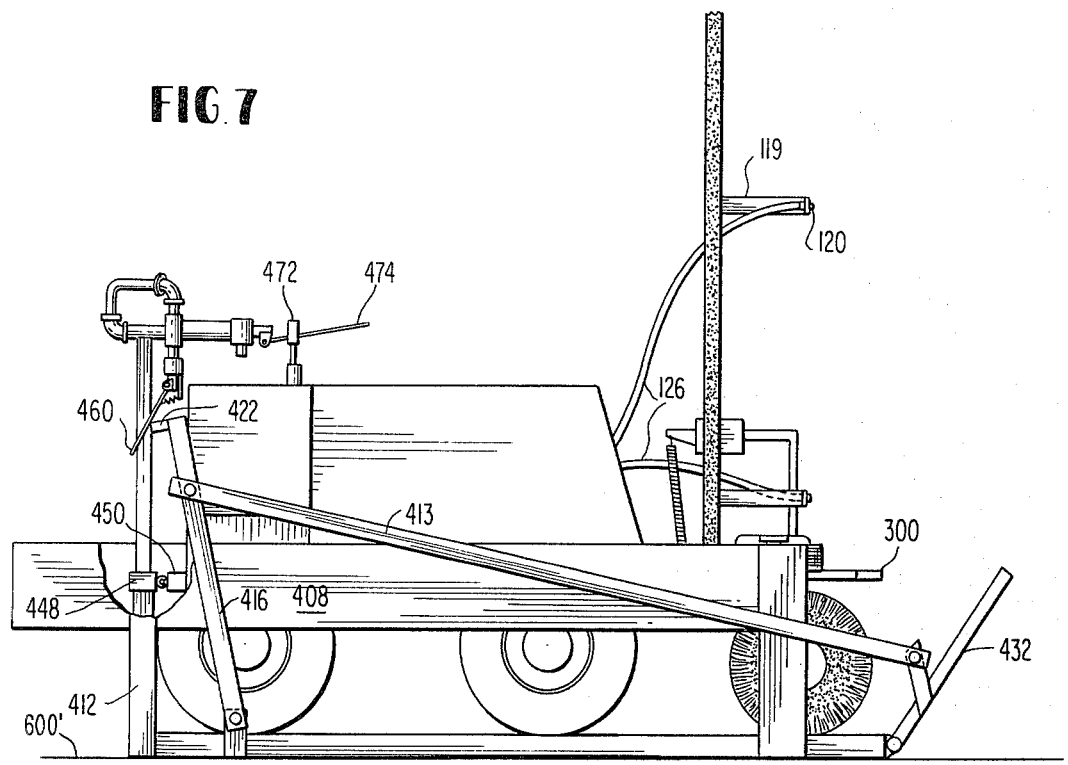
FIG. 7 is a side elevational view of the stationary base frame having the truck washer received therein, illustrating the operation of the automatic drop gate, the limit shut-off switch, and the automatic refilling means.

As illustrated in FIGS. 4 and 7, the washing apparatus is provided with a stationary base frame member generally designated at 400. The base frame includes side frame members 406, 408 which are welded to upright members 412 to form a generally rectangularly shaped unit. The side frame members also serve as an alignment means for the washer apparatus. As shown in FIG. 3, the frame or chassis 30 of the washer apparatus is provided with a plurality of castor wheels 430 which are normally maintained at a small distance from the side frame members 406, 408. In the event that the washer apparatus becomes slightly misaligned with the base frame, or with the trailer body interior itself, the wheels 430 operate to engage the side walls of the trailer body or the side frame members of the base frame to correct the misalignment. The upright members 412 are welded to guide track members 410, 420 (see FIG. 5) which together form the bottom of the base and support the wheels 12 of the washing apparatus.

Figure 6:
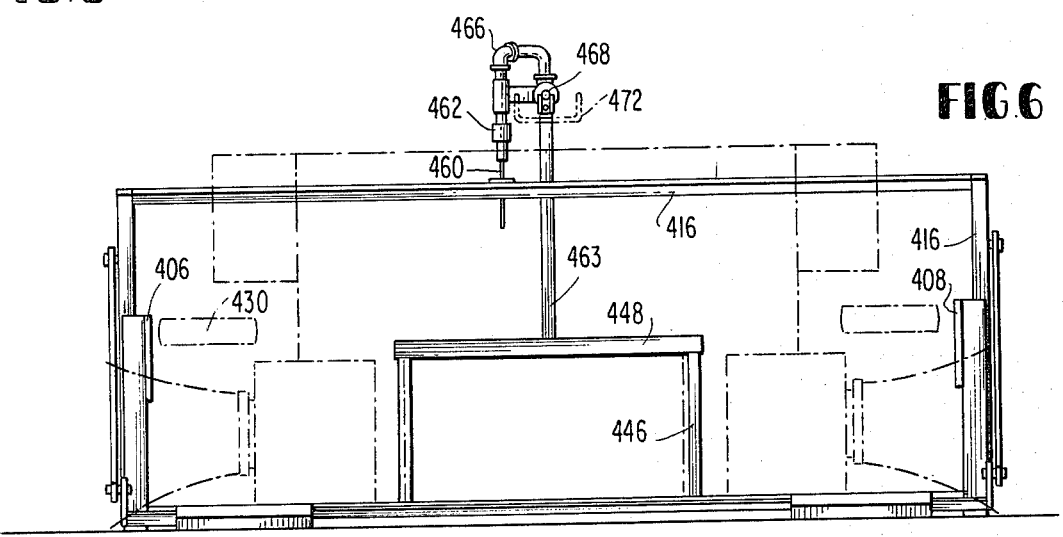
FIG. 6 is a front elevational view of the stationary base frame illustrated in FIG. 5, with the position of the truck washer being outlined in phantom.

The stationary base frame is further provided with an automatic drop gate means 430. The drop gate means includes two steel plates 432, 434 which are contiguous with guide track members 410 and 420, being hinged thereto at 436. The plates 432, 434 are provided with a generally upright connecting bar 438 which is pivotally connected at 440 to an arm member 413. The arm 413 is pivotally connected at its opposite end to a lever arm 416 at a pivot point 414. At its lower end, the lever arm 416 is pivotally connected to the base frame as shown at 418. The automatic drop gate is designed so that the weight of plates 432, 434 is sufficient to maintain the drop gate in the lowered position as shown in FIG. 4, so that when the washing apparatus exits the stationary base, the plates 432, 434 remain in the lowered position to facilitate the re-entry of the washing apparatus into the base frame. As the washing apparatus re-enters the base frame, and moves rearwardly therein, the housing 40 abuts against the upper right corner of the lever arm 424, thereby moving the lever arm to the left as shown in FIG. 4, thus raising the plates 432, 434. At the end of its leftward travel, the lever arm 416, and the plates 432, 434 assume the positions shown in FIG. 7. As shown in FIG. 6, the rear of the base is provided with two vertical bars 446 which support a horizontal bar 448. The horizontal bar acts as an abutment for a "kill switch" 450 which is mounted on the rear of the washing apparatus. When the washing apparatus reaches its rearwardmost position in the base, the switch 450 contacts the horizontal bar 448, thus interrupting the flow of current from the batteries 50 to the electric motor 60, thus turning off the machine. At about the same time, the leftward travel of the lever arm 416 causes an abutment member 422 to contact a valve actuating lever 460, as shown in FIG. 7, which is part of the automatic water refilling means. At this point, the batteries may be recharged in a conventional manner by a hookup to a standard 110 V outlet, if necessary.

The water refilling means forms a part of the stationary base frame 400, and is supported at the rear thereof by a bar 463 which is welded onto the horizontal bar 448. As shown in FIG. 4, the refilling means includes a first valve 462 which receives a water hose (not shown) connected to an outside source of water, typically a conventional water faucet. The first valve 462 is connected at its outlet 464 to conduits which are connected by elbows 466 which conduct water to a second valve 468. The first valve 462 is maintained in a normally closed condition while the second valve 468 is normally open. When the washing apparatus reaches the rear of the base, the actuating lever 460 is moved to the left by the abutment member 422 as shown in FIG. 7. Water is then allowed to flow to the second valve 468, exiting therefrom at 470. The water flowing from the valve 468 is allowed to pour through an opening 200 formed in the water storage means 32, thereby replenishing water which was consumed during the washing process of the trailer body. The water storage tank 32 is provided internally with a conventional float ball (not shown) which is connected to a generally U-shaped riser 472. As the riser 472 is moved upwardly by the float ball, it comes into contact with an actuating lever 474 which serves to close the second valve 468. As shown in FIG. 7, when the actuating lever 474 reaches a position slightly above the horizontal, the valve 468 becomes entirely closed, the water storage tank 32 now being completely refilled.

In use, the washing apparatus operates essentially as follows: A trailer to be washed is positioned with its open rear end adjacent the dock 600 where the stationary base frame housing the washing apparatus is mounted. Alternately, the base frame and washer apparatus may be mounted on a laterally movable base 600' which can be moved into position behind the trailer for driveby use, thus eliminating the necessity of backing the trailer into position adjacent a dock. The laterally movable base is fully shown and described in my U.S. Pat. No. 4,112,533, the disclosure of which is hereby incorporated by reference.

The operator presses a push button to energize the electric motor, which in turn actuates the three hydraulic motors by way of the hydraulic oil pump. The hydraulic motors, as previously indicated, supply power for the water pump, the rotary brushes, and the drive for the washing apparatus. At the same time, the water pump begins to pump water from the reservoir to the chemical injector, where it is mixed with detergent from the tank 108. The water is then conducted by means of conduits to the spray nozzles 120 to begin the cleaning operation. As the device exits its base frame, the automatic drop gate is lowered to bridge the gap between the base frame and the rear floor of the trailer body to be washed. The device then travels down the length of the trailer, continuously applying soapy water to all four surfaces of the trailer interior, at the same time scrubbing the floor and side walls of the trailer by means of rotary and stationary brushes as previously described. When the machine reaches the front wall of the trailer body, a contact lever engages a switch which actuates solenoids to close valve 118 and open valve 122 to stop the spraying of detergent, and begin the spraying of rinsing water mixed with chemical disinfectants. The switch also actuates a four-way valve to reverse the direction of the drive motor 52, so that the machine begins to travel rearwardly out of the trailer body. When the device exits the rear of the trailer body, it rolls back onto its base frame, traveling over plates 432 and 434 of the drop gate, and then closes the gate behind it. The rearward travel of the apparatus in its base frame actuates the water refilling means, and the apparatus engages a shutoff switch which turns off the electric motor.

The water refilling means, thus actuated, begins to refill the water storage tank 32 through an opening in the top thereof. A float ball situated inside the tank raises a riser bar, which in turn contacts an actuating lever 474. When the tank is full, the actuating lever serves to cut off the flow of water from the refilling means. At any time subsequent to the shutoff of the electric motor, the batteries may be recharged in a conventional manner by plugging a charger into a standard 110 volt outlet, if necessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:
1. An apparatus for washing the interior of a vehicle of the type having a rear opening therein, comprising a self-propelled movable frame driven by means of an electric motor and operable to enter the rear of said vehicle for cleaning the same, electric storage batteries mounted on said movable frame and operable to power said electric motor, drive means powered by said electric motor and operable to propel said movable frame, water storage means mounted on said movable frame, water pump means for delivering water under pressure to a spraying means, and brush means for scrubbing the floor and at least a portion of the interior side walls of said vehicle.

2. The combination of claim 1 wherein said drive means comprises a hydraulic oil pump driven by said electric motor and a first hydraulic motor driven by said hydraulic oil pump.

3. The combination of claim 1 wherein said water pump means is driven by a second hydraulic motor powered by said hydraulic oil pump.

4. The combination of claim 1 and further comprising, base frame means operable to house said movable frame means when said washing apparatus is not in use.

5. The combination of claim 4 wherein said base frame means includes automatic drop gate means operable to bridge the gap between said base frame and said vehicle body.

6. An apparatus for washing the interior of a vehicular body of the type including a rear opening therein, said apparatus comprising:
   (a) a stationary base frame means having an automatic drop gate,
   (b) a movable frame having a plurality of wheel members, said stationary base frame being constructed so as to receive said movable frame when the latter is not in use,
   (c) an electric motor powered by batteries mounted on said movable frame,
   (d) a hydraulic oil pump powered by said electric motor,
   (e) a first hydraulic motor powered by said hydraulic oil pump and operable to drive said wheel members,
   (f) a second hydraulic motor powered by said hydraulic oil pump and operable to power a water pump, and
   (g) a water storage means in communication with said pump for directing water under pressure to spraying means.

7. The combination of claims 1 or 6 further comprising, detergent storage means and disinfectant storage means mounted on said movable frame adjacent said water storage means.

8. The combination of claim 7 wherein said detergent storage means and said disinfectant storage means are in communication with said pump by way of a valve means.

9. The combination of claim 4 or 6 wherein said base frame means is provided with automatic refilling means for replenishing said water storage means when said washing apparatus is not in use.

10. The combination of claim 9 wherein said automatic refilling means is actuated by a linkage means associated with said base frame means.

11. The combination of claim 9 wherein said automatic refilling means is deactuated by a valve which is operatively connected to a float ball.

12. The combination of claim 9 wherein said base frame means is mounted on a stationary dock.

13. The combination of claim 9 wherein said base frame means is mounted on a laterally moving base.

14. The combination of claims 1 or 6 wherein said spraying means includes a spraying arch mounted on said frame for spraying cleaning and rinsing fluids throughout said vehicle body.

15. The combination of claim 6, further comprising cleaning brush means journalled on said movable frame, and adapted to scrub the floor or said vehicular body.

16. The combination of claim 15 wherein said brush means are rotatably powered by a third hydraulic motor.

17. An apparatus for washing the interior of a vehicular body and including a base and a movable frame having wheel members powered by a motor, and spraying means for spraying the interior of the body, the improvement comprising:
   (a) electric motor means powered by batteries mounted on said frame for providing power for said motor,
   (b) water storage means mounted on said frame,
   (c) a pump in communication with said water storage means for delivering water under pressure to said spraying means, and
   (d) means for automatically refilling said water storage means, said refilling means being actuated by said movable frame.

* * * * *